Sept. 9, 1924.
R. H. WHITE
TRACTOR
Filed Feb. 13, 1922   3 Sheets-Sheet 1
1,507,762
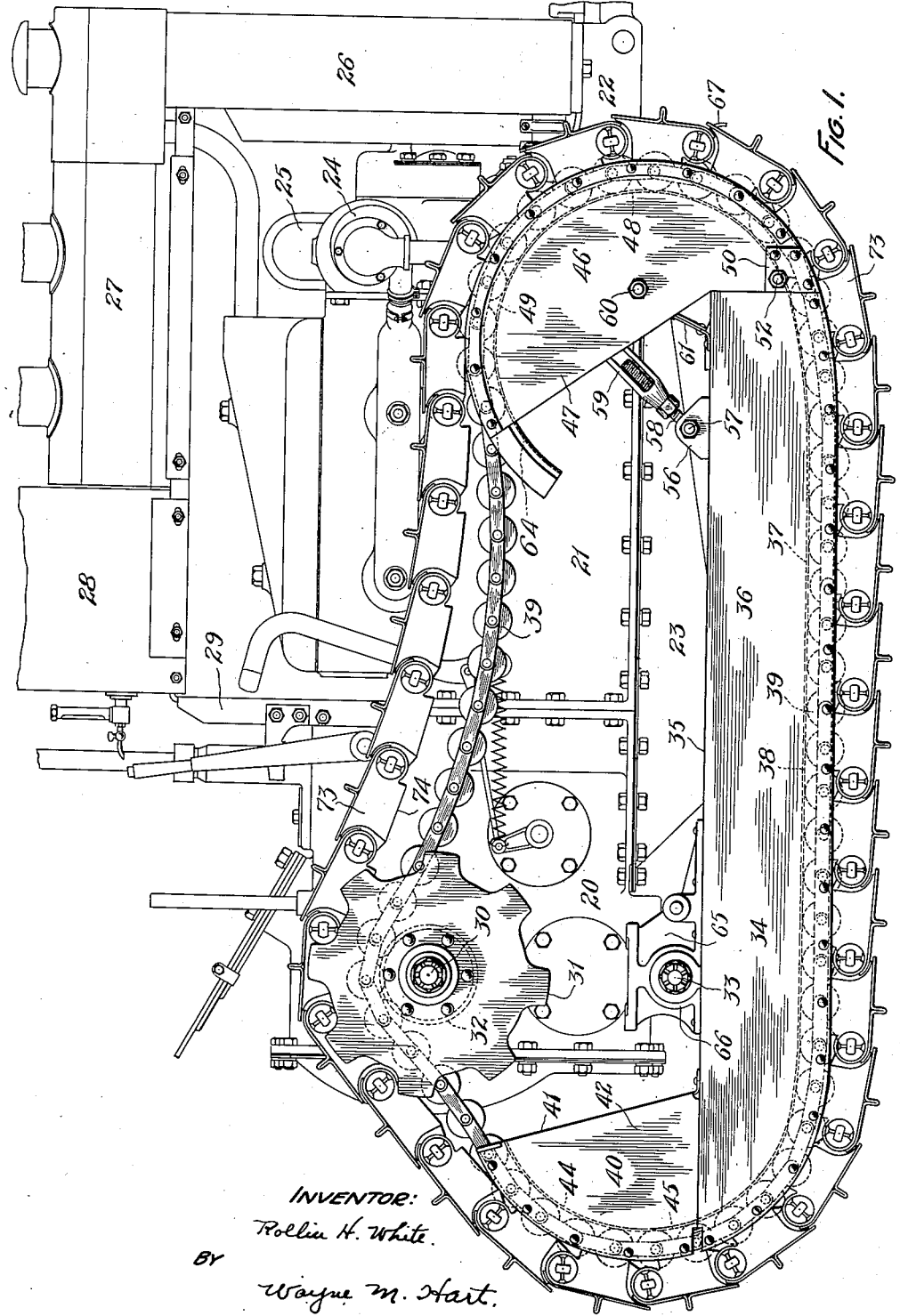
INVENTOR:
Rollin H. White.
BY
Wayne M. Hart.
ATTORNEY.

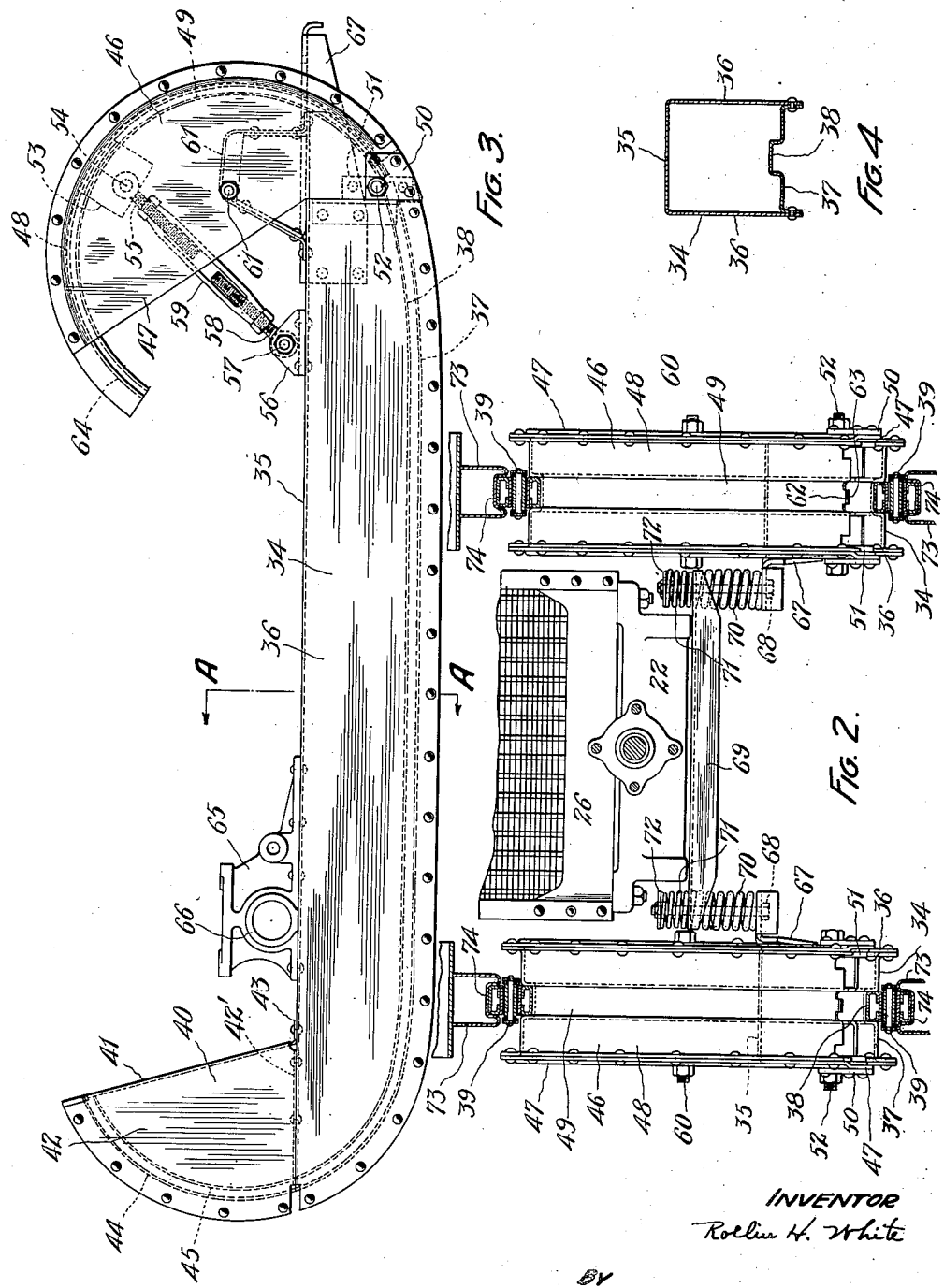

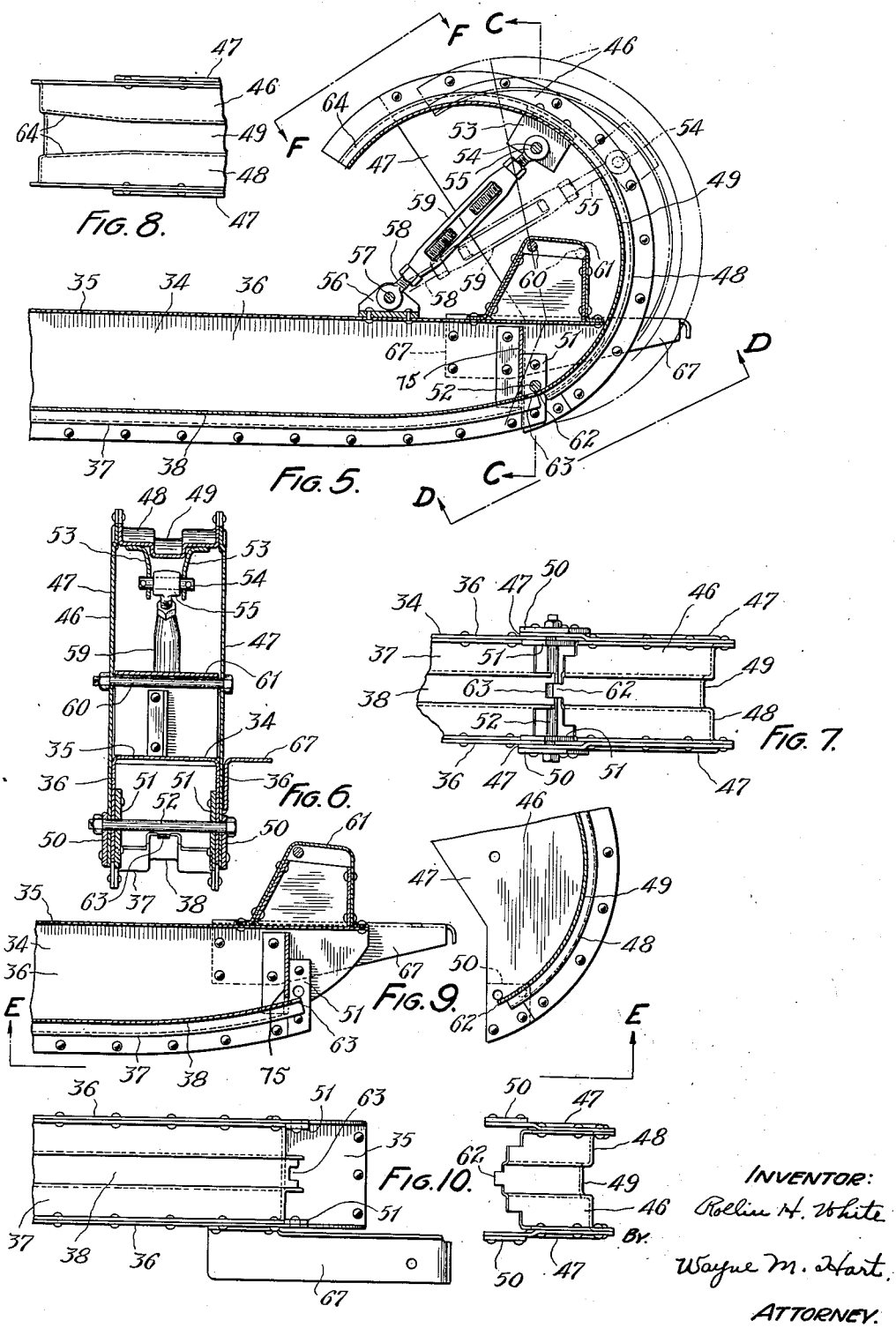

Patented Sept. 9, 1924.

1,507,762

UNITED STATES PATENT OFFICE.

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

TRACTOR.

Application filed February 13, 1922. Serial No. 536,152.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Tractors, of which the following is a full, clear, and exact description.

This invention relates to tractors of the tracklaying type and relates more particularly to the track members or track wheels and their relation with the tractor body.

One of the objects of this invention is to provide track members which are so constructed that the usual sprockets, idlers and stationary bearing supports carried thereby are eliminated.

Another object is to provide a suitable runway in the track member to accommodate a roller bearing chain constructed of a series of rollers linked together.

Another object is to provide mechanism on the track members for tensioning both the roller chain and the track which surround each member.

Another object of this invention is to provide a support or connection for the track members with the tractor body, whereby the track members can oscillate and also have a resilient connection with the body, independent of each other.

Another object of this invention is the provision of means on the tractor body for guiding and driving the track belt, and guiding the roller bearing chain.

In the drawings, Figure 1 is a side elevation of the assembled tractor;

Fig. 2 is a front elevation of the lower portion of the tractor;

Fig. 3 is a side elevation of the track frame with the track and the roller chain removed;

Fig. 4 is a sectional view of the track frame taken on lines A—A of Fig. 3;

Fig. 5 is a fragmentary longitudinal section of the track frame illustrating the front adjustment;

Fig. 6 is a section of the track frame on lines C—C of Fig. 5;

Fig. 7 is an elevation of the abutting ends of the track frame and its adjustment taken on lines D—D, of Fig. 5;

Fig. 8 is a top view of the track frame taken on lines F—F, of Fig. 5;

Fig. 9 is a vertical section of the track frame and front hinged member separated; and Fig. 10 is a view on lines E—E of Fig. 9 showing the track frame and front hinged member separated.

In the drawings the main frame or body of the tractor consists of a transmission unit 20, an engine unit 21 and a front gear cover unit 22 bolted together forming a rigid construction. A pan 23 is secured under these three sections of the main frame and serves as a bottom cover and a lubricant container. The front gear cover casting carries the water pump 24, the magneto 25 and the radiator assembly 26. Secured above the engine by a cradle are the fuel tank 27 and the air purifier 28, the cradle being secured at its front end to the radiator assembly and at its rear end to a standard 29 which is secured to, and projects up from the transmission casting.

The transmission unit 20 includes a hollow casting carrying the usual transmission mechanism which terminates in aligned drive shafts 30. These shafts project from each side of the casting and transmit power to double sprockets 31 carried on hubs 32 which are secured to the projecting end of each shaft. An axle 33 is secured transversely through hollow hubs integral with the transmission casting, and projects from each side thereof at a point below the transmission mechanism and vertically in line with the driving axles.

The tractor body, or main frame just described is supported by two similar track members which are located along each side thereof, both consisting of several sections assembled together. The main track frame section 34 of each track member is formed from two pieces of sheet metal, one of which is bent to form an open frame comprising a flat horizontal top 35 and depending sides 36. A closure plate 37 extends between the sides of the main section 34 and is as stated, formed of sheet metal and is bent to form longitudinal edges which extend down and lie adjacent the lower inner edges of the depending sides, the adjacent edges being secured together by rivets, or similar means. This closure plate is provided with a central pressed-in runway 38, which extends the longitudinal length thereof and provides a bearing seat for an endless roller chain 39. The sides 36 of the frame section 34 are cut away at each end to extend upwardly and the closure plate is bent at its ends to curve upwardly adjacent the sides. A front closure plate 75 is positioned transversely across the main track frame and is secured to the inner walls of the depending sides thereof.

An upstanding rear track frame guide section 40 is secured at the rear end of the main track frame section 34. This rear section is formed of a semi-circular sheet of metal bent to form a top 41 and sides 42. The circular edges of the sides are positioned to form a continuation of the sides of the main track frame section and the sides are turned under at 42' and are riveted to the top of the main member. A tongue 43 projecting from the top 41 is bent out and secured against the top of the main track frame section. A closure plate 44 is secured between the outer circular edges of the sides 42 and forms a continuation of the closure plate of the main track frame section when assembled therewith. The closure plate is provided with a central pressed in runway 45 and bent down edges which are riveted to the inner circular edges of the sides.

The rear guide section, it will be seen forms a closed hollow structure, as does the main section of the track frame to which it is secured.

A front track frame guide section 46 having a semi-circular outer surface is secured at the front end of the main track frame section. The front section is formed of two semi-circular plates 47 and a curved sheet metal closure plate 48 having a pressed in central runway 49. The closure plate extends between the plates 47 and has its edges bent out and riveted to these plates near their outer circular edges. A reinforcing plate 50 is secured to each of the plates 47 on their lower outside portion and reinforcing plates 51 are secured to the inside front end of the sides 36 of the main track frame section. The rear reinforced portions of the plates 47 extend outside of the reinforced sides 36 and a bolt 52 extends through the overlapping portions and reinforcing plates carried thereby, for pivoting the main section and front guide section together, suitable means being provided for securing the bolt in position. The runway and the outer edges of the plates which comprise the front guide member, are positioned to form a continuation of the curved front ends of the sides and runway forming the main track frame section.

Secured to the inside of closure plate 47 are depending brackets 53 which are perforated to provide a bearing for pin 54, to which is pivotally attached a threaded eye bolt 55. A bracket 56 having perforated sides is secured near the forward end on the top of the main member and provides a bearing for pin 57, to which is pivotally attached a threaded eye bolt 58. A turnbuckle 59 connects the threaded eye bolts 55 and 58. By turning the turnbuckle the front guide member can be drawn forward, or backward, with respect to the main track member at the pivotal connection 52, and by this mechanism the tension of the roller chain and the track is regulated. A bolt 60 extends through and is secured to the sides of the pivoted front guide section 46 and is enclosed by a sheet metal bulk head 61 which is secured to the forward end of the top portion of the main side member. The front and rear walls of the bulk head limit the movement of bolt 60 and therefore limit the pivotal action of the front guide section.

The closure 48 is cut away at the end adjoining the main track member providing a tongue 62 which extends into a recess 63 cut in the end of the runway 38 in the main member. The tongue is long enough to remain within the recess at the extreme extended point of pivotal adjustment between the main member and front member, thereby forming a continuous runway for the roller chain. The outer ends of the sides of the runway 49 are flared at 64 to guide the roller chain as it enters the runway.

Cast brackets 65 having hollow sleeves 66 are secured near the rear end and to the top portion of the main track frames 34. The shaft 33 projecting at each side from the main frame extends through the hollow sleeves and is secured thereto permitting the side track members to pivot freely therewith. Secured to the inner sides of the main track frame members and near the forward ends thereof are guides 67 having extended portions which are perforated to receive bolts 68. These bolts extend through holes in the end projections of the bar 69 which is secured transversely to the underside of the front gear housing 22. Coiled springs 70 are secured around the bolts between the bar 69 and the guides 67, and coiled springs 71 are secured around the bolts between the bar 69, and washers 72 which are retained on the bolt by nuts. Thus it will be seen that the track frame members are pivoted to the main frame at a point below all transmission mechanism, in vertical line with the driving shafts, and that the front ends thereof are resiliently connected to the main frame for relative independent movement vertically, with respect to each other, and to the main frame.

An endless roller chain 39 surrounds each track frame member, being in contact therewith in the continuous runway, and extends over the hubs of the driving sprockets 31. An endless track 73 of a conventional form, having a runway 74 for the endless roller chain, extends around each side frame member and endless roller chain, and extends over the sprockets 31, the teeth of which engage the chains adn transmit power in a conventional manner to rotate the track. It will be observed that the endless roller chain and track are in contact only during the engagement of the roller chain with the runway of the track frame. The sprocket hub is of such a size that the rotation of the roller chain bearing thereon is substantially equal to the rotation of the hub, thereby reducing the friction therebetween to a minimum.

In accordance with the provisions of the patent statutes I have described the principle of construction and operation of my invention, together with the apparatus which I now consider to represent the best embodiment thereof; but I desire to have it understood that the apparatus shown is only illustrative and that the invention can be carried out by other means.

What I claim is:

1. A track frame member comprising a main frame section, a rear guide section secured to said main section, a front guide section pivoted to said main section, and a bulkhead for preventing lateral movement of said front guide section relative to the main section, and means secured to said front guide section co-operating with said bulkhead to limit the pivotal movement of said section.

2. A track frame member comprising a main frame section, a rear guide section secured to said main frame, a front guide section pivoted to said main frame, a hollow bulk head secured to said main frame abutting each side of said front guide section and having the sides thereof slotted, and a bolt secured to said front guide section and extending through the slots in the sides of said bulk head to limit the pivotal movement of said front guide section.

3. A track frame member comprising a hollow main section including a top, sides, and a closure plate formed with a longitudinally extending groove, said plate being spaced from said top and secured between said sides; a hollow upstanding section secured to one end of said main section including a top, sides, and a curved closure plate formed with a longitudinally extending groove providing a continuation of the groove in said main section, said plate being secured between said sides; and a hollow upstanding section secured to the other end of said main section including sides and a closure plate secured therebetween, said plate being formed with a longitudinally extending groove, forming a continuation of the groove in the main section.

4. A track frame member comprising a closed hollow box shaped main section having the bottom formed with a longitudinally extending groove, a closed hollow upstanding section secured upon the top of said main section at one end thereof, said upstanding section having a curved bottom provided with a longitudinally extending groove joining the groove in said main section, and a semi-circular upstanding section adjustably secured to the other end of said main section, said semi-circular section having a curved closure plate provided with a groove in alignment with the groove in said main section.

5. A track frame member comprising a hollow main section including a top having downturned sides and a longitudinally grooved closure plate spaced from said top and secured between said sides; an upwardly extending hollow section secured to the rear end of said main section including a top having sides bent therefrom and a curved longitudinally grooved closure plate spaced from the top and secured between the sides; and an upwardly extending hollow section secured to the front end of said main section, said section including sides having a curved longitudinally grooved closure plate secured therebetween, the sides and closure plates of said sections forming a continuous structure.

In testimony whereof, I hereunto affix my signature.

ROLLIN H. WHITE.